United States Patent Office 3,386,583
Patented June 4, 1968

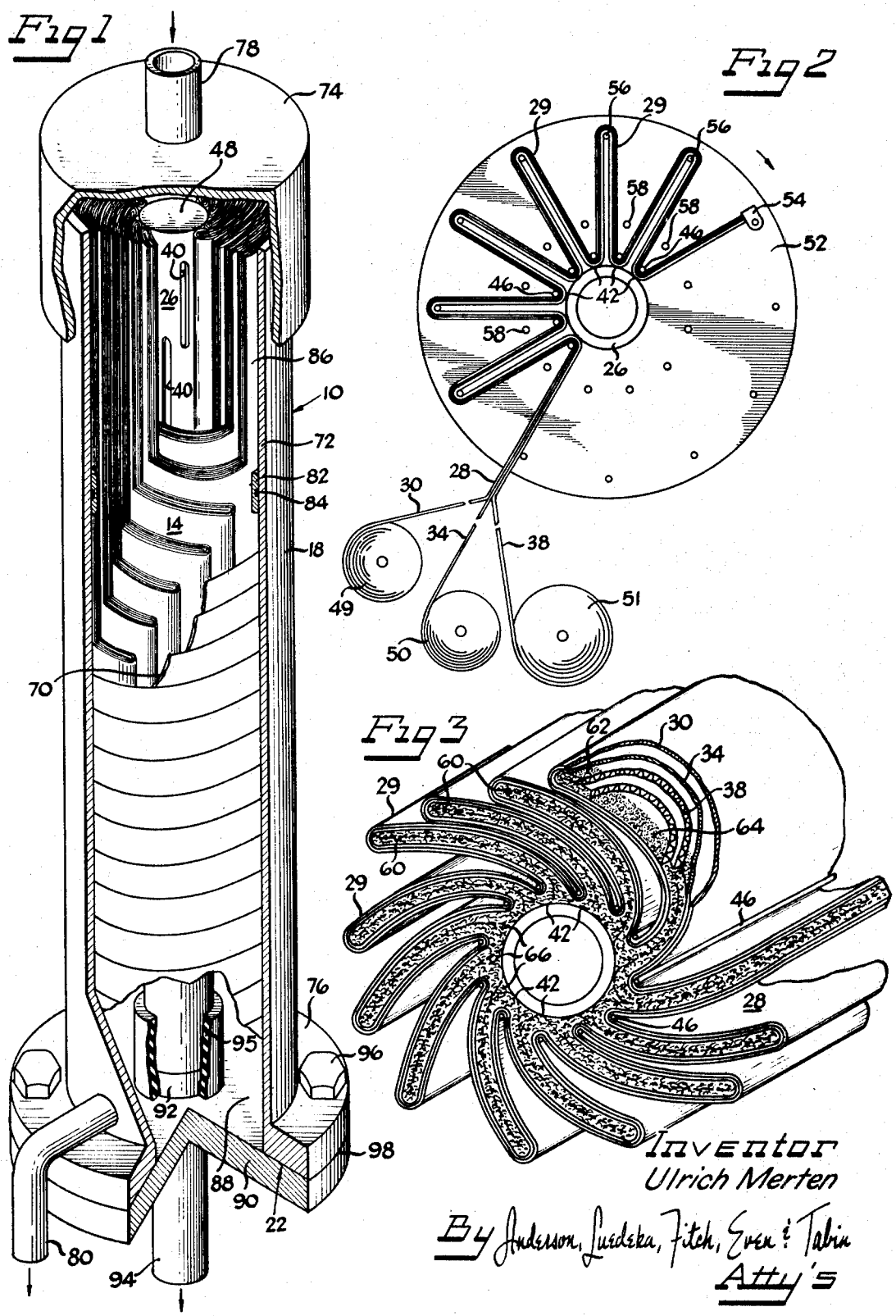

3,386,583
REVERSE OSMOSIS MEMBRANE MODULE
Ulrich Merten, Solana Beach, Calif., assignor, by mesne assignments, to Gulf General Atomic Incorporated, San Diego, Calif., a corporation of Delaware
Filed June 11, 1965, Ser. No. 463,112
6 Claims. (Cl. 210—321)

ABSTRACT OF THE DISCLOSURE

A device for separating a solvent from a solution via reverse osmosis and a method for making such device. An elongated sheet of semipermeable membrane material is flanked on opposite surfaces by a sheet of porous backing material and a sheet of spacer material to provide a three-ply layup, and the layup is convolutely folded and arranged around a central porous mandrel with the backing material layer in fluid communication with the center of the hollow mandrel. The individual folded flaps are spirally wound about the mandrel and wrapped with tape about the exterior circumferential surface thereof. The spacer material provides axially extending feed solution passageways between adjacent flaps while the permeating fluid travels spirally inward in the plane of the backing material to the central mandrel.

---

This invention resulted from work done under Contract No. 14-01-0001-250 with the Office of Saline Water in the Department of the Interior, entered into pursuant to the Saline Water Act, 42 U.S.C. 1951–1958g.

The present invention relates generally to an improved purification apparatus, and more particularly relates to an improved apparatus and a method of manufacture thereof for efficiently purifying or concentrating a desired product. The present apparatus has numerous applications in a variety of fields, and is particularly advantageous for use in desalinating brackish water or sea water.

The rapidly increasing scarcity of reserves of fresh water has accelerated the need for providing an apparatus for efficiently desalinating brackish water or sea water. Numerous attempts have been made to accomplish water desalinaton operation with varying degrees of success. For example, evaporation processes have not generally been feasible due to the relatively high costs involved. For the same reason various solar distillation apparatus have also been economically unfeasible for purifying water. Similarly, electrical methods of purification employing ion removal procedures have generally proven to be uneconomical, when attempts have been made to employ such procedures on a commercial scale.

Apparatus utilizing the principles of osmosis have been quite successful when applied to large scale purification operations. A pending application Ser. No. 419,881 filed on Dec. 21, 1964, now U.S. Patent No. 3,367,504, sets forth a highly useful method and apparatus for recovering purified water from sea water and alternatively for concentrating a desired product through a unique application of the principle of reverse osmosis. In such an apparatus a relatively inexpensive membrane module was provided, incorporating an envelope, comprising two sheets of membrane material separated by a layer of backing material. The envelope was of a predetermined length and was spirally wound about a hollow mandrel.

The above-described apparatus has been quite successful. Apparatus fabricated in accordance with the principles of the present invention provides an even more simplified and inexpensive modular structure.

It is an object of the present invention to provide an improved apparatus for purifying or concentrating solutions of a solute in a solvent and a method of manufacture thereof.

It is another object of the present invention to provide an improved method and apparatus for the recovery of purified water from saline solutions by reverse osmosis.

It is another object of the present invention to provide an improved method and apparatus for recovering purified water from brackish water or sea water.

It is another object of the present invention to provide an improved method and apparatus for concentrating a solution comprising a solute in a solvent by reverse osmosis.

It is a further object of the present invention to provide an apparatus for recovering purified water from brackish water or sea water or concentrating the solutes contained in such brackish water or sea water by employing the principle of reverse osmosis and the employment of a simplified membrane module structure which may be conveniently manufactured and which may be conveniently replaced at a minimal expense.

Other objects and advantages of the present invention will become apparent when considered in conjunction with the accompanying drawings wherein:

FIGURE 1 is a perspective view, partially broken away, of a preferred embodiment of a purification unit containing a membrane module fabricated in accordance with the principles of the present invention;

FIGURE 2 is a plan view of a membrane layup during an initial step in the fabrication of a membrane module in accordance with the principles of the present invention; and FIGURE 3 is a perspective view of the membrane layup of FIGURE 2, more particularly illustrating certain structural details.

The present invention generally provides an economically fabricated apparatus for recovering purified water from brackish water or sea water in substantial quantities and is adaptable for use on a commercial scale. The apparatus employed applies the phenomenon commonly known as reverse osmosis.

The process of osmosis may be defined in general terms as the diffusion which proceeds through a semi-permeable membrane separating two solutions of unequal concentration which diffusion tends to equalize the concentration of the solutes in each solution. An ideal semi-permeable membrane has a definite permeability for one component of a solution, such as the solvent, while at the same time being totally impermeable to another component of the solution, such as the solute.

It is well known that in a typical osmosis operation pure water, for example, diffuses from a first solution having a lower solute concentration through the semi-permeable membrane into a second solution having a higher solute concentration. When the second solution is subjected to an elevated hydraulic pressure relative to the hydraulic pressure existing in the first solution diffusion of the purified water through the membrane into the second solution is restrained. The pressure at which diffusion into the second solution is substantially halted is the osmotic pressure. If the hydraulic pressure applied to the second solution is further increased relative to that of the first solution, so that the osmotic pressure of the second solution is exceeded, reverse osmosis occurs, i.e., water from the second solution diffuses through the membrane into the first solution.

The pressure at which reverse osmosis takes place is generally dependent upon the composition of the particular solutions disposed on opposite sides of the semi-permeable membrane, and such data is readily obtainable in various handbooks. If ordinary sea water is disposed on one side of a suitable semi-permeable membrane, while a solution of relatively pure water is present on the other side of the membrane, reverse osmosis ensues when a hydraulic pressure of approximately 375 pounds per square inch absolute is applied to the sea water. By providing a membrane structure having a large total surface area and providing an appropriate means for collecting the purified water, relatively large quantities of sea water or other such solutions may be economically purified on a commercially large scale.

Referring to the drawings, and particularly to FIGURE 1, a water purification unit 10 is illustrated, which includes a membrane module 14, a pressure tight container 18 for containing the module 14, and a product water take-off assembly 22. The construction of the membrane module 14 is illustrated in greater detail in FIGURES 2 and 3.

The module 14 generally includes a tubular central mandrel 26 which also serves as the product water collection means, or product water take-off tube. A membrane layup 28, comprising a plurality of radially extending flaps 29, is disposed about the circumference of the mandrel 26, and the flaps 29 are spirally wound on the mandrel 26, forming a convoluted configuration, prior to placing the module 14 within the pressure-tight enclosure 18.

The membrane layup 28 comprises adjacent elongated sheets of spacer material 30, semipermeable membrane material 34 and backing material 38. The manufacture of a membrane module constructed in accordance with the principles of the present invention entails the fabrication of a membrane layup 28, which is plurally folded upon itself a plurality of times to define a number of flaps, thereby providing a relatively large area of membrane surface through which product water may diffuse. At the same time, since each of the flaps 29 is of relatively short longitudinal length the distance through which the product water flows is minimized, thereby also minimizing pressure drop.

Preferably the semi-permeable membrane material 34, which comprises the plurally folded membrane layup 28, is in the form of a relatively thin sheet of material, which has predetermined permeability properties. When desalination operations are intended, it is advantageous to fabricate the membrane material of a substance which exhibits substantial salt rejection properties. An example of one such material which has been found to be highly advantageous for use in such applications is cellulose acetate, such as is disclosed in Loeb et al. U.S. Patent Nos. 3,133,132 and 3,133,137. But, in certain instances, numerous other materials, which also exhibit substantial salt rejection properties are utilizable, although lower rates of flow of purified water may result.

The backing material 38 is preferably fabricated of a relatively inexpensive material, having sufficiently high porosity properties to permit unencumbered flow of product water therethrough. The backing material 38 is also capable of withstanding substantial applied pressures without collapse or undue creep. In addition, the backing material 38 is preferably sufficiently flexible so that it can be initially supplied from supply rolls, folded upon itself, and then wound in a generally convoluted configuration without being fractured, since it is desirable that its continuity be maintained for efficient operation.

When subjected to relatively high pressure, certain materials become compacted, resulting in a reduction in their porosity, and this factor also should be considered when selecting a suitable backing material. Graphite cloth is a material which has in certain instances been considered for use as the backing material, but is normally too expensive. Several types of glass felt have also been considered, and found advantageous in certain instances. Properly sized silicon carbide grit or properly sized sand particles, with the grains usually held together with a suitable binder material, and disposed on a sheet of plastic felt has also been developed, and is desirable for use in certain instances.

When pressures are anticipated which do not exceed 500 pounds per square inch, a wide variety of fibrous plastic materials may advantageously be employed as the backing material. Examples of such materials are nylon, polyester, rayon, rayon viscose and acrylic fibers, which are unaffected by exposure to the types of fluids being processed and are adaptable to wetting by the particular adhesive employed.

The backing material 38 serves as a flow channel for the product water which has diffused through the membrane material 34, and accordingly extends substantially through the membrane layup 28. Since the membrane layup 28 is plurally folded upon itself, as previously described, the portion of the backing material 38 within each of such separate folds or flaps in effect serves as an individual flow channel for the purified water to follow to the take-off tube 26. Thus, a plurality of relatively short product water flow channels are provided.

On the other hand, the spacer material 30, which separates adjacent folds of the membrane layup 28 generally serves as a passageway for the feed water which is to be purified. During operation of the apparatus, the feed water is generally supplied through the spacer material 30 in a direction generally parallel to the axis of the tube 26 and at right angles to the direction of flow of the product water, which generally flows spirally through the convoluted backing material 38 toward the central tube 26. The spacer material 30 is preferably in the form of a relatively inexpensive grid-like structure, such as woven screen, and generally provides a low-resistance path for the feed water to follow in passing through the module 14.

The central mandrel 26 is tubular and is provided with a plurality of slots or apertures 40 positioned on its outer circumferential surface and extending through its wall. The apexes 42 of each of the folds of the membrane layup are maintained in position, seating tightly against the central tube 26 by suitable position maintainers or posts 46, as is subsequently explained. Thus, fluid communication is provided between the slots 40 and the backing material 38, which carries the product water, so that the product water may flow through the slots 40 into the hollow interior of the tube 26 from which it may be appropriately removed through the take-off assembly 22. Preferably, the tube 26 is plugged at its upper end by a suitable plug 48 disposed therein, so that the purified water, supplied to the interior of the tube 26, may be directed toward the other end, while precluding feed water from entering the tube 26. The tube 26 is generally fabricated of a corrosion resistant material, such as cellulose butyrate or extruded acrylic, since it is to be disposed in a relatively moist environment.

The particular structure described above is generally quite convenient to manufacture. The elongated sheets of material which comprise the membrane layup 28 are preferably initially contained on supply rolls 49, 50 and 51, as shown in FIGURE 2 so that they may be conveniently supplied during the manufacture of the membrane module. The respective sheets of material are simultaneously fed from the supply rolls 49, 50 and 51, with the flaps 29 being initially held in position, so as to form a fin-like configuration about the circumference of the mandrel 26. This is preferably accomplished by initially fabricating the layup 28 on a suitable fixture or jig 52, having a centrally located central opening adapted for receiving the mandrel 26.

In this connection, one end of the adjacent sheets of material, comprising the membrane layup 28, is maintained in position by a removable clamp 54 secured on the jig 52 adjacent its outer periphery. The layup 28 then is extended radially to the hollow mandrel 26 at which point it is folded upon itself with the apex 42 of the fold being maintained in position relatively tightly against the mandrel 26 by the position maintainer 46. Preferably the position maintainers 46 comprise thin plastic rods which may be conveniently secured in position on the jig 52, so as to maintain the respective apexes 42 of the flaps 29 in position. The layup 28 then extends radially outwardly from the mandrel 26, and is folded over a pin or post 56, which is inserted on the jig 52 at the same radial distance from the mandrel as is the clamp 54. The pin 56 preferably comprises a readily insertable and removable metal rod. A readily insertable and removable roller 58 adapted for axial rotation is mounted on the jig 52 spaced radially from the position maintainer 46. The jig is then rotated and the layup 28 is extended radially inwardly to the mandrel 26 and is folded upon itself with the apex 42 of the fold being secured to the mandrel 26 by another position retainer 46 secured on the jig 52 so as to maintain the apex 42 tightly against the periphery of the mandrel 26. The jig 52 is again rotated and the layup 28 similarly is extended radially outwardly from the mandrel 26 and is folded over another pin 56. Another axially rotatable roller 58 is then rotatably mounted on the jig 52 and similarly spaced radially from the position maintainer 46. In this fashion, the layup 28 is initially disposed on the jig 52 about the circumference of the mandrel 26, forming a continuous elongated fin-like structure, including a relatively large amount of flaps generally limited in number by the thickness of the sheets of material and the size of the casing in which the module is to be disposed. Thus the membrane layup 28 is fabricated of a plurality of flaps 29, each of which is relatively short in comparison to the overall length of the membrane layup.

When a desired number of flaps have been formed in the above-described manner, the respective sheets of material comprising the membrane layup 28 are separated from the supply rolls, such as by cutting. As shown in FIGURE 3, the starting end and the terminal end of the layup 28 are preferably sealed together with a suitable epoxy sealant, which strongly adheres to the materials after curing so that the clamp 54 may be removed. Alternatively, if desired the starting end and portions of the layup may be maintained in sealed relation by the clamp 54.

After completion of the formation of the plurality of flaps 29, the pins 56 are removed and the central tube 26 together with the position maintainers 46 are rotated on the jig 52 relative to the rollers 58. Since the rollers 58 are adapted for axial rotation, the flaps 29 readily slide under the rollers 58, which define the circumference of a cylinder. In this fashion the membrane layup is wound spirally about the central mandrel 26 to form the desired convoluted configuration. The spirally wound structure is generally cylindrical in shape and has a diameter approximately equal to the diameter of the cylinder defined by the rollers 58. Generally, for the sake of convenience the position maintainers 46 are merely allowed to remain in the completed structure, since they take up very little space and have substantially no effect on the operation of the apparatus.

In order to insure that the backing material 38 only communicates with solutions which have diffused through the membrane material 38, it is essential to provide suitable seals so as to provide separate feed passageways through which the feed water is supplied and product passageways through which the product water flows. In this connection a suitable epoxy sealant is applied on the outer edge 60 of the backing material 38 within each of the flaps 29. The epoxy sealant is applied relatively copiously along the edges 60 so as to substantially saturate this portion of the backing material 38. As a result of this saturated condition the epoxy sealant flows between the outer edges 62 and 64 of the adjacent sheet of backing material 38 and membrane material 34 along the outer edges of each of the flaps 29, thereby sealing substantially the entire outer edge of the membrane material 34 to the backing material 38 in each of the flaps 29 so as to define a plurality of product water passageways, extending through the respective flaps 29 comprising the membrane module 14.

When the flaps 29 are convolutely wound on the mandrel 26, a slight spacing 66 remains between the apexes 42 of adjacent flaps 29. This spacing 66 extends along substantially the entire axial length of the tube 26 and if left unsealed would permit feed water to enter the interior of the tube 26 through the apertures 40, thereby contaminating the purified water being produced. This problem is substantially alleviated by the liberal application of the epoxy sealant along the edge 60 of the flaps 29. Thus, sufficiently ample quantities of the sealant are applied so as to saturate the edges 60, as previously mentioned, as well as to cause portions of the excess to flow into the spacings 66, thereby sealing it from communication with the feed water.

The edge of the spacer material 30, which extends between adjacent flaps 29 is not sealed in position on the layup 28. Accordingly, the spacer material 30 defines a feed passageway, extending between adjacent flaps 29, so that the feed water may flow through the module 14 in an unencumbered fashion from one end to the other. By thus providing separate feed passageways and product passageways, the feed water may be supplied to the module 14 through the spacer material 30 without communicating with the backing material 38 prior to having diffused through the membrane material 34 so that only water from which the desired impurities have been removed reaches the product passageways.

Since it is contemplated that relatively high pressures are to be employed when utilizing the apparatus described herein, it is generally desirable to employ suitable sealant means so as to obtain adherent bonds which have sufficient strength to withstand such pressures. For example, when cellulose acetate is utilized as the membrane material, an appropriate adhesive which adequately seals the edges of the membrane material to the backing material and also seals the edges of the backing material from communication with feed water comprises a modified epoxy resin. Such an adhesive has been found to be compatible with the materials being used and adequately wets them, forming a high strength bond after completion of curing.

The spirally wound module is then suitably taped, as shown in FIGURE 1, about substantially all of its outer circumference. This is efficiently achieved by feeding a suitable plastic tape 70, which is tension sensitive so as to maintain the convoluted flaps 29 in position and which is substantially unaffected by moisture, between the rollers 58 and the outermost convolution of the module 14. Preferably a plastic tape such as that commonly designated by the trademark Mylar is employed. The module 14 may then be disposed in the pressure-tight enclosure 18.

Since each of the plurality of flaps 29 comprising the membrane layup 28, in effect serves as a separate path of travel for purified water it can be seen that the distance of travel of the purified water in flowing to the central mandrel 26 through the backing material 38 within the respective flaps is relatively short. At the same time the total surface area of membrane material available, through which purified water diffuses, is maintained relatively large by forming a plurality of flaps 29.

The pressure-tight enclosure 18 is preferably fabricated from a relatively strong corrosion-resistant material such as copper, polyvinyl chloride, coated mild steel, stainless steel, fiberglass-reinforced epoxy, etc. The enclosure 18 generally includes a cylindrical outer shell 72 having a cap 74 secured to its upper end and having a flange 76 secured at its lower end. The cap 74 and flange 76 may be secured to the shell 72 by various operations such as welding, brazing, etc. A suitable feed inlet pipe 78 is disposed in a generally central position on the cap 74, and a suitable waste outlet pipe 80 is further disposed in the shell 72 adjacent the flange 76.

Often the interior diameter of the enclosure 18 is approximately equal to the outer diameter of the spirally wound, taped module 14, so that a sufficiently tight fit is provided to direct the flow of feed water through the feed passageways, defined by the spacer material 30 extending through the module 14, rather than around the exterior of the module 14. If desired, additional sealing may be provided in some instances by wrapping several turns of a relatively narrow plastic tape (not shown) about a suitable location on the exterior of the module 14. In certain instances, where the spacing between the module and the interior of the enclosure 18 is too large to permit adequate sealing by the above-described means, a sufficient low pressure seal may be advantageously provided by disposing a grooved ring 82 about a suitable region on the exterior of the module 14. A suitable adhesive material, preferably a silicon rubber compound, is employed to cement the ring 82 to the module 14. An O-ring 84 is disposed in the groove provided on the ring 82 so as to complete the seal.

As a result of the seal provided by the above-described means, a feed compartment 86 and a concentrate compartment 88 are defined within the pressure tight container 18 and exterior to the membrane module 14. The seal means prevents direct communication between said feed compartment 86 and said concentrate compartment 88. In operation the fluid which it is desired to process may be supplied through the inlet pipe 78 and directed from the feed compartment 86 through the feed passageways, defined by the plural folds of spacer material 30 between adjacent flaps 29 of the module 14, into the concentrate compartment 88.

The purification unit 10 also includes the product water take-off assembly 22, as previously mentioned. The product water take-off assembly 22 preferably includes a flange 90 having a nipple 92 disposed on its interior surface and a product water outlet pipe 94 on its exterior surface communicating with the nipple 92. A suitable connector 95 which preferably comprises a short piece of rubber tubing is disposed over the end of the nipple 92 at one end and disposed over the lower end of the take-off tube 26 on its other end. Thus, fluid communication is provided between the interior of the tube 26 and the product water outlet pipe 94. Preferably the take-off assembly 22 is secured to the flange 76 by securing the flange 90 to the flange 76 by a plurality of bolts 96. Generally, a gasket 98 is also disposed intermediate the flanges 90 and 76 for providing a fluid-tight seal.

The apparatus described above may be employed for treating a wide variety of solutions, but is particularly adapted for the treatment of saline solutions, such as sea water. Thus, the operation of the apparatus is described in terms thereof for the sake of simplicity. In operation, the sea water is supplied through the feed inlet pipe 78 as shown by the arrow, to the feed compartment 86, from which it flows through the passageways, defined by the spacer material 30 extending between the adjacent flaps 29, comprising the membrane module 14, into the concentrate compartment 88. Upon completion of its passage through the purification unit, the sea water, which has been processed, and is more highly saline than originally, is discharged from the concentrate compartment 88 through the waste outlet pipe 80 as shown by the arrow. This discharged material may be referred to as the "sea water residue."

Throughout its residence time in the purification unit 10 the sea water is preferably maintained at a predetermined pressure. The pressure is in excess of that required to cause reverse osmosis to occur. At pressures in excess of the osmotic pressure purified water diffuses from the sea water through the semi-permeable membrane into the backing material. The requisite pressures are advantageously obtained through utilization of an appropriate pump (not illustrated), which supplies the sea water to the purification unit, and by further providing an appropriate pressure control valve (not illustrated) in the waste outlet pipe 80, thereby adjusting the pressure of the sea water present in the feed passageways, defined by the spacer material 30 extending between adjacent flaps 29 of the membrane module 14, as desired. In addition, the pump is preferably adjusted to provide a relatively constant flow of sea water through the feed passageways. Such a provision is desirable because it promotes the maintenance of an equilibrium salt concentration in the solutions being processed, thereby obviating the need for diluting more concentrated solutions prior to processing, or for increasing the applied pressure.

The purified product water diffuses through the plurality of flaps 29, defined by the plurally folded sheet of membrane material 34 as the sea water flows through the feed passageways, defined by the spacer material 30 extending between adjacent flaps 29. This product water diffuses into the backing material 38 disposed within the plural flaps 29 of membrane material, and thereupon flows spirally inwardly toward the mandrel 26 through the backing material 38, comprising the product passageway, until it reaches the apertures 40. Since the apex 42 of each of the flaps 29 is disposed in contact with the outer circumference of the tube 26, providing fluid communication between the backing material 38 and the hollow interior of the tube 26, purified water flows into the tube 26. Upon reaching the hollow interior of the tube 26, one end of which is plugged, the product water flows out through the opposite end of the tube 26 through the take-off assembly 22 and out through the product water outlet pipe 94. If desired, the purification unit 10 may be disposed in a vertical position so that the purified water may flow out through the open end of the tube 26 by gravity.

Generally, the product water undergoes a drop in pressure as it flows through the backing material from the point, where it initially diffuses through the semi-permeable membrane to the point where it reaches the take-off tube 26. Such a pressure drop is generally proportional to the square of the distance traversed by the water and is inversely proportional to the square of the effective hydraulic diameter of the pores in the backing material, when the volumetric flow per unit area of the member is maintained at the substantially constant rate. It is thus advantageous to provide a backing material having relatively large-size pores in order to minimize such a pressure drop. But, since the backing material functions for supporting the membrane sheet as well as carrying the purified water, the size of the pores must be sufficiently small to preclude portions of the membrane material from being forced into the pores.

In order to operate at high levels of production and efficiency, it is desirable to employ membrane modules having as large a membrane surface area as possible so as to substantially increase the amount of purified water which is produced. The structure described herein achieves this objective, while maintaining the pressure drop developed within acceptable values from an engineering standpoint, by minimizing the distance through which the product water must flow. At the same time the apparatus may be fabricated in a highly convenient and efficient manner so as to substantially decrease the unit costs of manufacture.

In this connection the individual folds in the membrane layup 28 are generally less than two feet in length so that the pressure drop developed as a result of the distance traversed by the product water is maintained at a minimal level. Moreover, the total area of membrane material available, through which purified water may diffuse, is maximized without any increase in the distance through which individual portions of purified water travel. This results from the fact that the portions of purified water which diffuse through the membrane material 34 merely traverse the distance defined by the length of the portion of the backing material adjacent the particular fold. This distance is substantially independent of the total length of the membrane material employed and the total number of folds comprising the membrane layup 28. Accordingly, the module may be manufactured having a desired amount of membrane area.

It is normally quite advantageous to employ a plurality of purification units having membrane modules constructed in accordance with the principles of the present invention, since the total production of the purified water may thereby be substantially increased. Generally such units are suitably interconnected with the pump means at their respective inlet pipes and with appropriate header connections at their respective outlet pipes so as to form a complete water desalination plant adaptable for providing large quantities of desalinated water.

It is generally preferable to employ membrane modules which are prefabricated, and such a provision may be readily made when utilizing an apparatus of the present invention. The interconnections between the plurality of purification units comprising the complete plant are preferably arranged for convenient periodic shutdown of individual purification units without disrupting the operation of the remaining units so as to permit convenient and rapid replacement of the individual membrane modules. This provision is advantageous since it is anticipated that eventual replacement of the individual membrane module assemblies may become necessary due to corrosive effects of some saline solutions. Thus, the plant construction described above, permitting rapid and economical replacement of the individual purification units, yields numerous advantages.

As indicated above, a particular aqueous solution may be readily concentrated by use of the present apparatus if such is desired, in addition to, or instead of producing purified water. In carrying out such concentration procedures it is merely necessary to provide a suitable means for collecting the more concentrated solution previously designated as the sea water residue. The purified water then comprises the waste product, while the more concentrated solution from which the purified water has been removed comprises the product.

Thus, there has been provided an improved apparatus for the recovery of purified water from brackish water or sea water or for concentrating a particular aqueous solution, which is very economical to manufacture and is durable in use.

It will be understood that various modifications and changes will be apparent to those skilled in the art from the foregoing description. Such modifications are deemed to be within the scope of the appended claims.

Various features of the present invention are set forth in the following claims.

I claim:

1. A separation device for the separation by reverse osmosis of a solvent from a solution of solute in that solvent, which device comprises a tubular hollow mandrel having a porous sidewall, a continuous membrane layup including a continuous elongated sheet of semipermeable membrane material having a continuous substantially laterally coextensive sheet of porous backing material and a continuous laterally coextensive sheet of spacer material respectively disposed adjacent opposite surfaces of said sheet of membrane material, said membrane layup being arranged in surrounding relationship to said mandrel and convolutely folded to form a plurality of generally radially extending flaps of membrane material with said porous backing material disposed within said flaps, said plurality of flaps each being spirally wound about said mandrel, said backing material being in fluid communication with the hollow center of said mandrel through said porous sidewall, said continuous sheet of spacer material defining a plurality of feed passageways between adjacent flaps of membrane material extending parallel to the axis of said mandrel, and means sealing the lateral edges of said sheet of backing material to prevent flow into said backing material from the edges thereof, said porous backing material defining a plurality of fluid flow passageways within each of said flaps extending radially inward to said mandrel.

2. A separation unit for the separation by reverse osmosis of a solvent from a solution of solute in that solvent, which unit comprises a pressure-tight right circular cylindrical enclosure having a feed compartment at one end thereof including a feed inlet pipe, a concentrate compartment at the opposite end thereof having a concentrate outlet pipe and a take-off assembly having a fluid outlet pipe, a tubular hollow mandrel having a porous sidewall, a continuous membrane layup including a continuous elongated sheet of semipermeable membrane material having a continuous substantially laterally coextensive sheet of porous backing material and a continuous laterally coextensive sheet of spacer material respectively disposed adjacent opposite surfaces of said sheet of membrane material, said membrane layup being arranged in surrounding relationship to said mandrel and convolutely folded to form a plurality of generally radially extending flaps of membrane material with said porous backing material disposed within said flaps, said plurality of flaps each being spirally wound about said mandrel and each having a radial length greater than the radial distance between said mandrel and said cylindrical enclosure wherein said mandrel is coaxially disposed, said backing material being in fluid communication with the hollow center of said mandrel through said porous sidewall, said continuous sheet of spacer material defining a plurality of feed passageways between adjacent flaps of membrane material extending parallel to the axis of said mandrel, means sealing the lateral edges of said sheet of backing material to prevent flow into said backing material from the edges thereof, said porous backing material defining a plurality of fluid flow passageways within each of said flaps extending radially inward to said mandrel, and tape wrapped about substantially the entire outer cylindrical surface of said convolutely folded and spirally wound membrane layup, which taped surface lies adjacent the inner surface of said cylindrical enclosure, said hollow mandrel being in fluid communication with said outlet pipe of said take-off assembly.

3. A method for manufacturing a cylindrical device for the separation of a desired product from a solution, which method comprises the steps of providing a tubular mandrel having a porous sidewall, forming a 3-ply membrane layup of an elongated sheet of semipermeable membrane material flanked on one surface by an elongated backing material sheet and on the other surface by an elongated sheet of spacer material, winding said 3-ply layup about spaced apart radially inner and outer posts on a jig to form a convolute configuration surrounding the mandrel which is disposed centrally of said jig, said convolute configuration having a plurality of spaced-apart flaps of semipermeable membrane material each extending generally radially outward from said mandrel with said backing material being disposed within said flaps, installing a plurality of upstanding rollers onto said jig at locations which define the desired circumference of the cylindrical device, one of said rollers being disposed between each pair of adjacent flaps, removing the posts from the radially outer extremities of said flaps, and rotating the remaining inner posts relative to the rollers to cause said flaps to pass radially inside of said rollers and be spirally wound about said mandrel into a cylindrical configuration of desired circumference.

4. A method in accordance with claim 3 wherein the spacer material, the semipermeable membrane material and the backing material are fed from three separate rolls and wherein the jig is intermittently rotated during the formation of the convolute configuration.

5. A method in accordance with claim 4 wherein a sealant is applied along both lateral edges of the backing material sheet to block any fluid flow into said membrane flaps except through said semipermeable membrane material.

6. A method in accordance with claim 5 wherein sufficient sealant is applied to seal the lateral edges of said backing material which lie adjacent the central mandrel to the outer surface of the mandrel after the spiral winding, and wherein the outer circumferential surface of said spirally wound flaps of said 3-ply layup is wrapped with tape.

References Cited

UNITED STATES PATENTS

| | | | |
|---|---|---|---|
| 2,152,373 | 3/1939 | Bronson et al. | 156—172 |
| 2,970,699 | 2/1961 | Leuthesser et al. | 210—457 |

FOREIGN PATENTS

| | | |
|---|---|---|
| 1,359,427 | 3/1964 | France. |
| 588,991 | 6/1947 | Great Britain. |

OTHER REFERENCES

Osburn, J. O., and Kammermeyer, K., "New Diffusion Cell Design," Industrial and Engineering Chemistry, vol. 46, No. 4, pp. 739–742.

REUBEN FRIEDMAN, *Primary Examiner.*

W. S. BRADBURY, *Examiner.*